(No Model.) 4 Sheets—Sheet 3.
J. R. WILLIAMS.
TOBACCO STRIPPING AND BOOKING MACHINE.
No. 449,394. Patented Mar. 31, 1891.
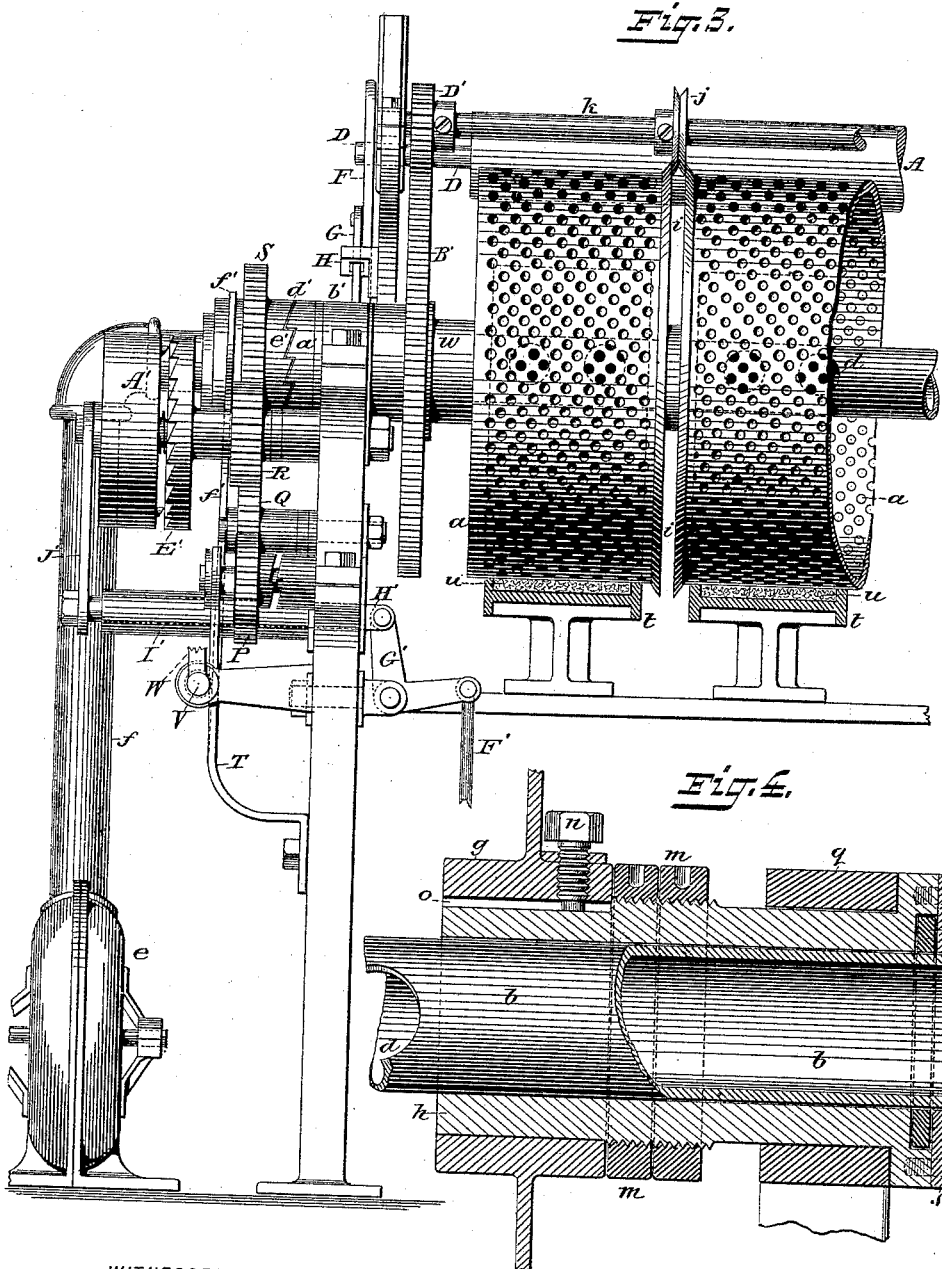
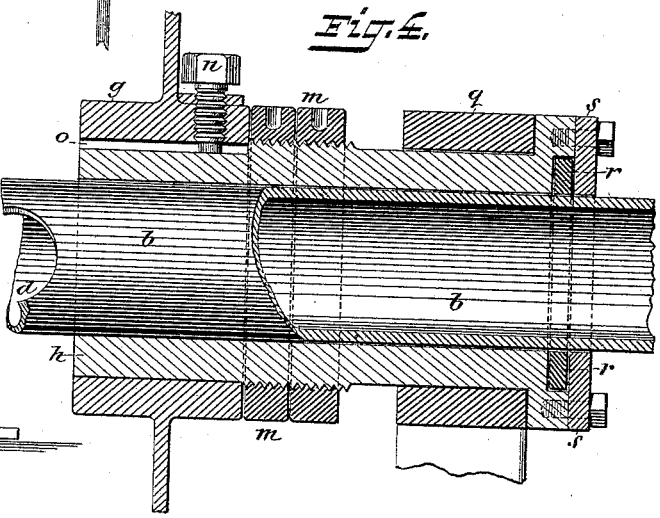
WITNESSES:
Gustave Dieterich
W. A. C. Matthis
INVENTOR
John R. Williams,
BY Chas. C. Gill
ATTORNEY (No Model.) 4 Sheets—Sheet 4.
J. R. WILLIAMS.
TOBACCO STRIPPING AND BOOKING MACHINE.
No. 449,394. Patented Mar. 31, 1891.
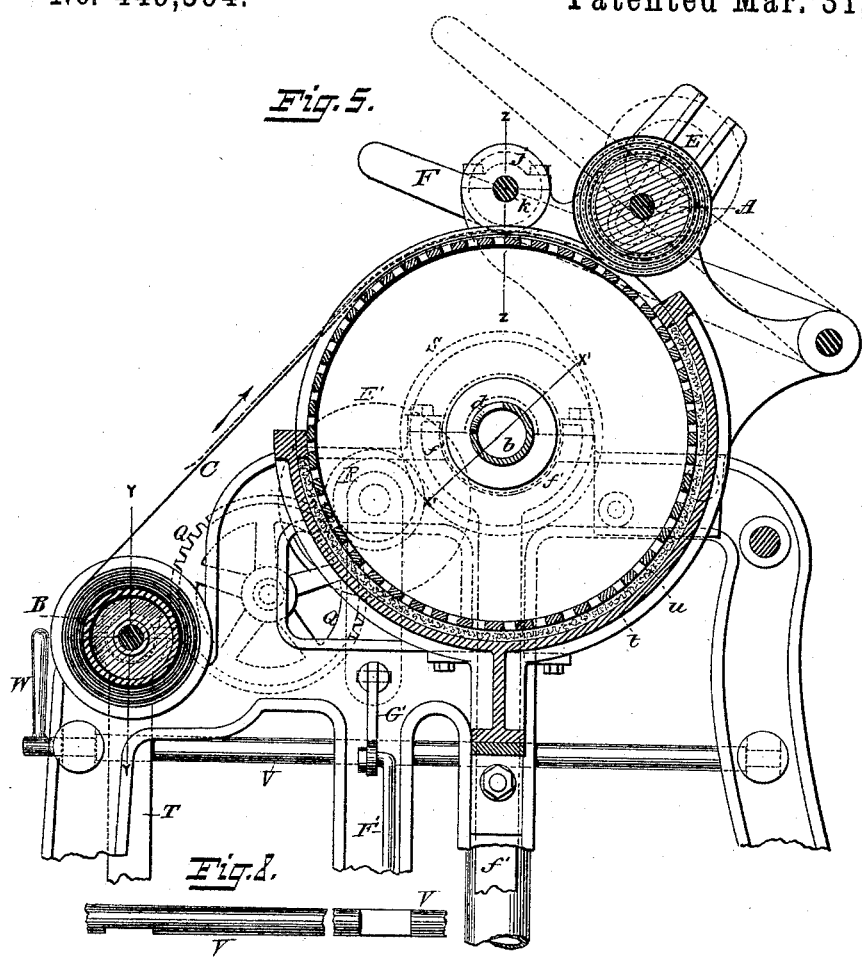
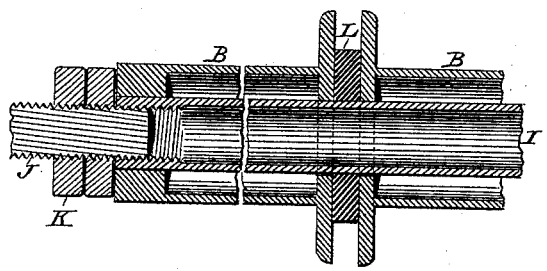
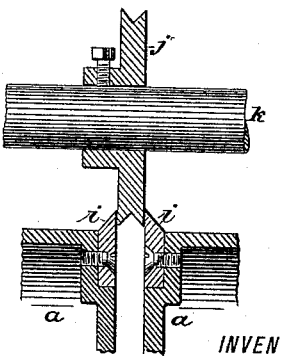
WITNESSES:
INVENTOR
John R. Williams,
BY
Chas. C. Gill
ATTORNEY

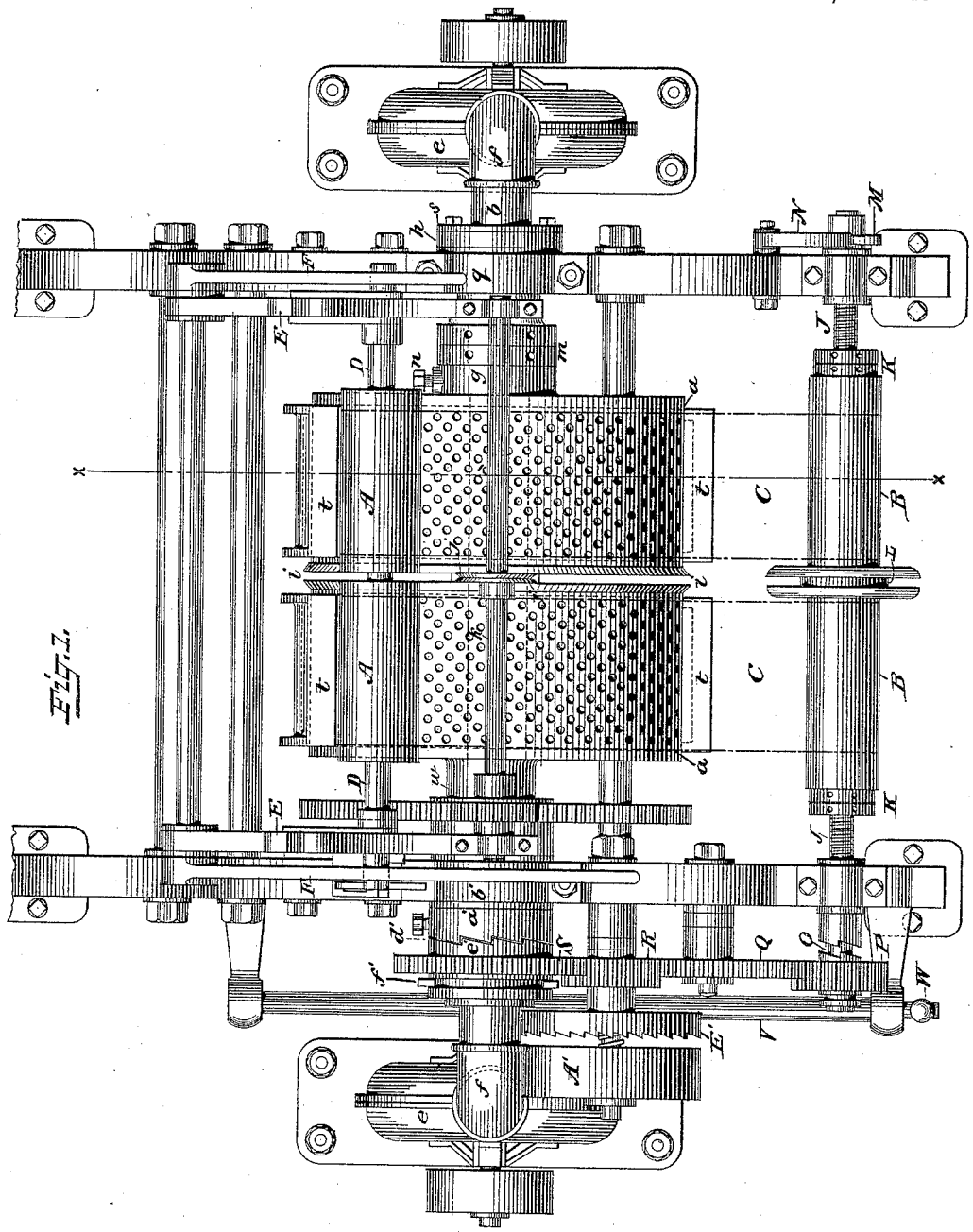

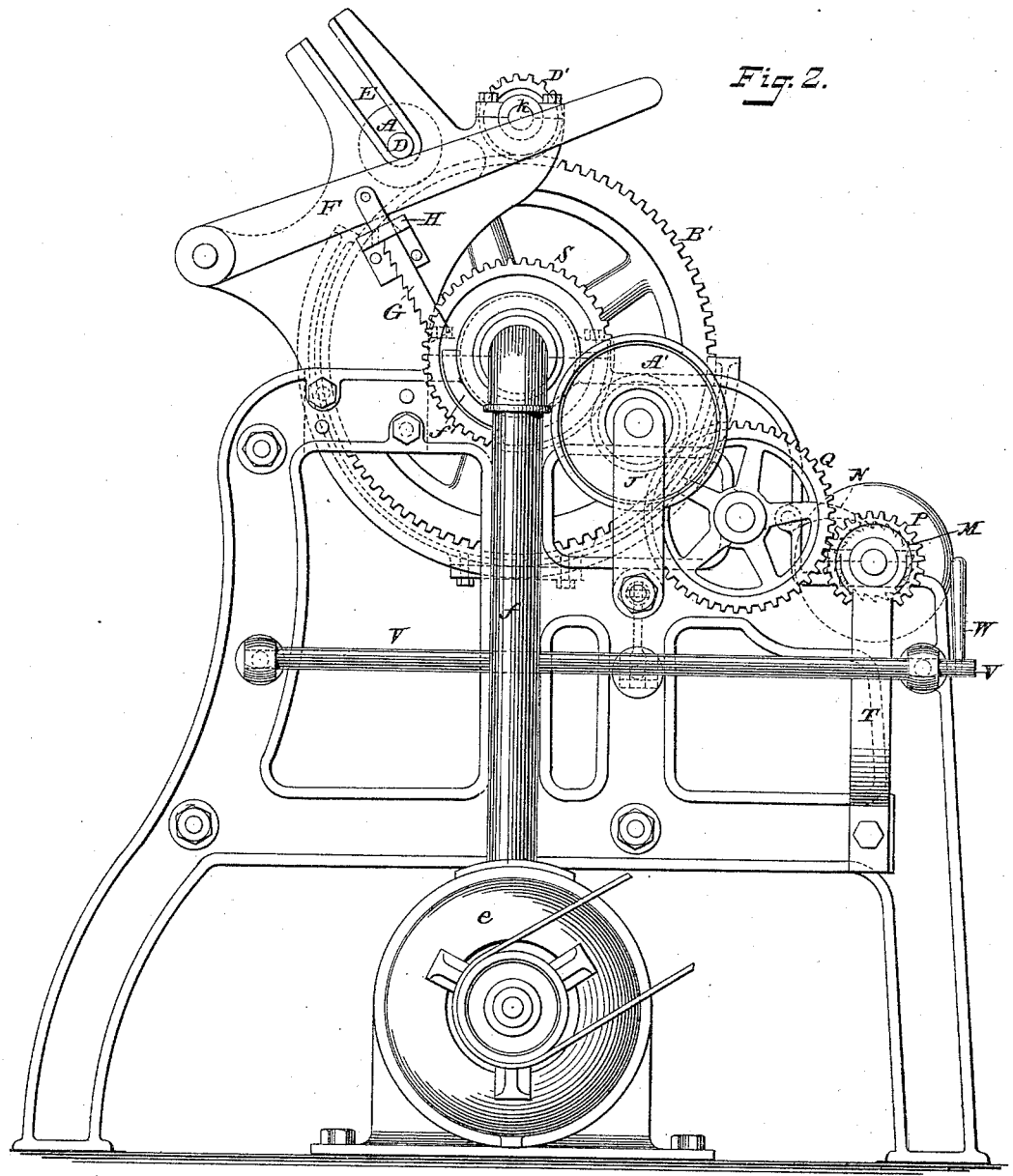

UNITED STATES PATENT OFFICE.

JOHN R. WILLIAMS, OF NEWARK, NEW JERSEY, ASSIGNOR TO THE JOHN R. WILLIAMS COMPANY, OF NEW YORK, N. Y.

TOBACCO STRIPPING AND BOOKING MACHINE.

SPECIFICATION forming part of Letters Patent No. 449,394, dated March 31, 1891.

Application filed October 16, 1888. Serial No. 288,257. (No model.)

*To all whom it may concern:*

Be it known that I, JOHN R. WILLIAMS, a citizen of the United States, and a resident of Newark, in the county of Essex and State of New Jersey, have invented certain new and useful Improvements in Tobacco Stripping and Booking Machines, of which the following is a specification.

The invention relates to improvements in stripping and booking machines, and embodies mechanism for stripping the stems from tobacco-leaves while said leaves are moving on traveling aprons and being held smooth thereon by air-pressure.

In carrying my invention into effect I make use of rollers adapted to revolve in either direction and move the porous aprons carrying the tobacco-leaves across perforated cylinders connected with an air-exhaust and operating in conjunction with revolving cutters, which strip the stems from said leaves, the exhaust meanwhile acting through said perforated cylinders and porous aprons to hold the leaves smooth and dispense with the manipulating and spreading of the leaves by hand. The rollers are adapted while revolving in one direction to wind the aprons and stripped leaves into the usual books, and while revolving in the opposite direction to unwind said aprons and permit the said leaves to be withdrawn and arranged for use in the customary manner.

The invention will be understood from the detailed description hereinafter presented, reference being had to the accompanying drawings, in which—

Figure 1 is a top view of a machine embodying the invention, the aprons being shown by dotted lines; Fig. 2, an end view of same; Fig. 3, a front elevation, partly broken away, of the perforated cylinders and cutters with the gearing for applying power, the bands for closing the perforations along the rear and lower sides of said cylinders being shown in section; Fig. 4, a section of the hollow axle and collars thereon for the perforated cylinders, said section being on the dotted line X' X' of Fig. 5; Fig. 5, a vertical section on the dotted line X X of Fig. 1; Fig. 6, a vertical section on the dotted line Y Y of Fig. 5; Fig. 7, a vertical section on the dotted line Z Z of Fig. 5; and Fig. 8, a detached view of the rod V, showing the flattened portions thereon, hereinafter referred to.

In the drawings, A A and B B respectively designate the rollers for the traveling aprons C C, the latter being of any suitable porous and flexible material and arranged to travel back and forth from one pair of rollers to the other.

The rollers A A are mounted on the axle D, which is loosely set in the slots E, formed in opposite sides of the frame of the machine. The ends of the axle D of the rollers A project over the pivoted levers F, (shown more clearly in Fig. 2,) and as the aprons C C are wound upon said rollers the axle D is gradually caused to ascend the slots E, owing to the increased diameter of the rollers A A, by reason of the apron being wound upon them. When it is desired to lift the rollers A A from the slots E, this may be conveniently done, owing to the fact that the upper ends of said slots are open. During the winding of the aprons upon the rollers A A and the gradual ascent of the ends of the axle D up the slots E the levers F may be moved upward, in order that the ends of said axle may have a bearing upon them at the different elevations of said axle in said slots, the levers F being sustained in any desired position by reason of the threaded racks G, pivoted to said levers and capable of sliding upward freely and of engaging the rigid pawls H.

The lower pair of rollers B B are mounted upon the shaft I, secured between the opposite sides of the frame of the machine, the said rollers being in the form of sleeves (see Fig. 6) and the shaft I being hollow and engaged at opposite ends by the screws J, carrying jam-nuts K, by which the rollers may be pressed toward each other and against the disk L, the purpose being to regulate the speed with which they shall revolve around the shaft I. The ends of the screws J constitute the ends of the shaft I and, as aforesaid, have bearings in the opposite sides of the frame of the machine. At the right-hand end of the shaft I is provided the ratchet-wheel M, which is engaged by the pivoted pawl N, which prevents the rollers B B from moving except in the direction desired. When the aprons C C are traveling upward from the rollers B B to the rollers A, the pawl N will be disengaged from the ratchet-wheel M; but when said aprons are moving in a contrary direction from the rollers A to the rollers B the said pawl will be placed in engagement with the ratchet M, where it will prevent the rollers B from revolving in any direction except that toward the front of the machine, which will have the effect of winding the aprons C upon said rollers. Upon the left-hand end of the shaft I is provided the clutch O, the movable half of which carries the pinion-wheel P, said wheel being in engagement with the intermediate wheel Q, which engages the pinion R, the latter meshing with the main gear-wheel S. The movable half of the clutch O is connected with the spring-bar T, (shown clearly in Figs. 2 and 5,) and said bar is arranged against a flattened surface of the horizontal rod V, which, when being turned by the handle W, operates to cause said flattened surface on the rod V to press the spring-bar T inward or to permit it to move outward, thereby causing the clutch O to be in connection or to break said connection. The aprons C C, on their movement between the rollers A A and B B, travel across hollow perforated revolving cylinders $a\ a$, which are mounted upon the hollow axle $b$, having openings $d$ and being in connection with the suction-blowers $e$, pipes $f$ passing from said suction-blowers to the ends of said hollow axle $b$. The ends of the cylinders $a\ a$ are solid throughout, and said ends carry at their center collars $g$, (see Fig. 4,) which are secured upon the sleeves $h$, encircling the hollow axle $b$. The facing ends of the cylinders $a\ a$ are recessed, as shown more clearly in Fig. 7, to receive the cutting-rims $i$, which are secured in place by the screws and operate in conjunction with the revolving cutter $j$, secured upon the center of the shaft $k$, the purpose of these central cutters being to remove the stem from the center of the tobacco-leaves as they are gradually moved upward on the aprons C C to the booking-rollers A A. The cylinder $a$ on the right-hand side of the center of the machine is adjustable toward or from the cutter $j$ and the other cylinder $a$ by means of the jam-nuts $m$, (shown in Figs. 1 and 4,) which engage threads on the sleeve $h$ and are adapted to be moved against the end of the collar $g$, forming the center of the end of said cylinder $a$. The collar $g$ is keyed by means of the screw $n$ and groove $o$ on the sleeve $h$, and hence the sleeve is caused to revolve with the cylinder upon the hollow shaft $b$. The end of the shaft $b$ is mounted in the bearings $q$, and air is prevented from escaping between the said hollow shaft $b$ and the sleeve $h$ at the end of said shaft by the packing $r$, which is secured in place by a plate $s$, as illustrated in Fig. 4.

The cutter-wheel $j$ is secured upon the shaft $k$ by means of a set-screw, as illustrated in Fig. 7, and is adjustable on said shaft, thereby adapting it for adjustment with relation to the cutters $i$, secured on the facing ends of the cylinders $a\ a$.

During the revolution of the cylinders $a\ a$ the air is prevented from acting on the rear and lower portions thereof by reason of the bands $t$, which encircle said portions of the cylinders and carry between edge flanges a layer of packing $u$, which effectually closes the perforations in that portion of the cylinders in contact with them and causes the suction to be exerted on the upper front portion of the cylinders $a$ alone, that being the portion over which the aprons C C travel on their passage from one pair of rollers to the other.

Upon the left-hand end of the hollow shaft $b$ is mounted the collar $w$, which supports the solid end of the adjacent cylinder $a$, and upon said end of the shaft is also mounted the sleeve $a'$, which is secured against lateral movement by the box $b'$ and constitutes one section of the clutch $d'$, the movable section $e'$ of which carries the gear-wheel S and is in connection with the upper end of the spring-bar $f'$, by which the said section $e'$ is adapted to be moved toward or from the stationary section $a'$. The spring-bar $f'$ impinges a flat surface on the rod V, as shown by dotted lines in Figs. 3 and 5, and when the rod V is turned so that its rounded portion is moved against said bar $f'$ the upper end of the latter will be forced inward and cause the movable section $e'$ of the clutch $d'$ to engage the stationary section $a'$ of same. When the sections $e'\ a'$ are connected, the motion from the power-wheel A' will be transmitted through the gear-wheel R to the gear-wheel S, and thence through the collars $w$ and $g$ to the cylinders $a\ a$, and through the gear-wheel B' to the pinion D', shaft $k$, and cutter $j$. A clutch E' is also provided for the power-wheel A', the engagement or disengagement of the same being effected by a foot-treadle (not shown) connected with the pitman-rod F', the bell-crank lever G', rod H', inclosed in sleeve I', and the bar J'. The motion of the gear-wheel R is communicated to the wheel S, as aforesaid, and also to the intermediate wheel Q and pinion P. The latter, however, will not cause the shaft I to rotate until the parts of the clutch O are caused to engage each other. The gearing will be in the condition shown in Fig. 1 while the stripping of the leaves is being performed and the aprons C C are traveling from the rollers B B to the rollers A A. After the books have been formed on the rollers A A the clutch $d'$ will be disengaged, stopping the movement of the cylinders $a\ a$, and the clutch O will be thrown into engagement, when the shaft I and rollers B B will be caused to revolve toward the front of the machine and gradually rewind upon themselves the aprons C C, during which the attendant will remove the stripped leaves as they appear and arrange them for use as wrappers or binders for cigars.

What I claim as my invention, and desire to secure by Letters Patent, is—

1. In a machine for stripping the stems from tobacco-leaves, the two pairs of rollers and the porous aprons arranged to move from one pair of said rollers to the other, combined with the perforated rotary cylinders connected with an air-exhaust and the pairs of rotary cutters for removing the stems, substantially as and for the purposes set forth.

2. In a machine for stripping the stems from tobacco-leaves, the perforated rotary cylinders mounted upon the hollow axle and the central cutters, one pair of the cutters being carried by said cylinders, combined with an air-exhaust in communication with said axle and cylinders, a pair of porous aprons traveling across said cylinders, and rollers for said aprons, substantially as set forth.

3. In a machine for stripping the stems from tobacco-leaves, the perforated rotary cylinders mounted upon the hollow axle and the central cutters, one pair of the cutters being carried by said cylinders and one of said cylinders being adjustable upon said axle, combined with an air-exhaust in communication with said axle and cylinders, a pair of porous aprons traveling across said cylinders, and rollers for said aprons, substantially as set forth.

4. In a machine for stripping the stems from tobacco-leaves, the perforated rotary cylinders, the central cutters, one pair of the cutters being carried by said cylinders, and the non-perforated bands along the rear and lower sides of said cylinders, combined with the air-exhaust in communication with the interior of said cylinders, a pair of porous aprons traveling across said cylinders, and rollers for said aprons, substantially as set forth.

5. In a machine for stripping the stems from tobacco-leaves, the perforated rotary cylinders carrying the cutters on the periphery of their facing ends and the revolving cutter-wheel arranged to act in conjunction with said first-mentioned cutters, combined with an air-exhaust in communication with said cylinders, a pair of porous aprons traveling across said cylinders, and rollers for said aprons, substantially as set forth.

Signed at New York, in the county of New York and State of New York, this 11th day of October, A. D. 1888.

JOHN R. WILLIAMS.

Witnesses:
CHAS. C. GILL,
W. A. C. MATTHIE.